April 14, 1942.   W. G. BALZ   2,279,434
FISHING REEL
Filed Feb. 18, 1939   2 Sheets-Sheet 1
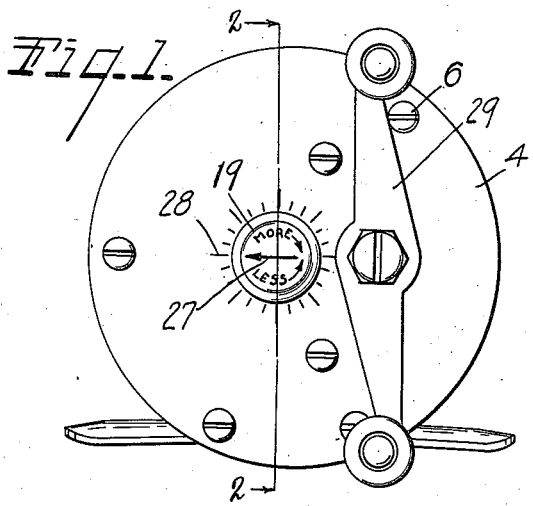
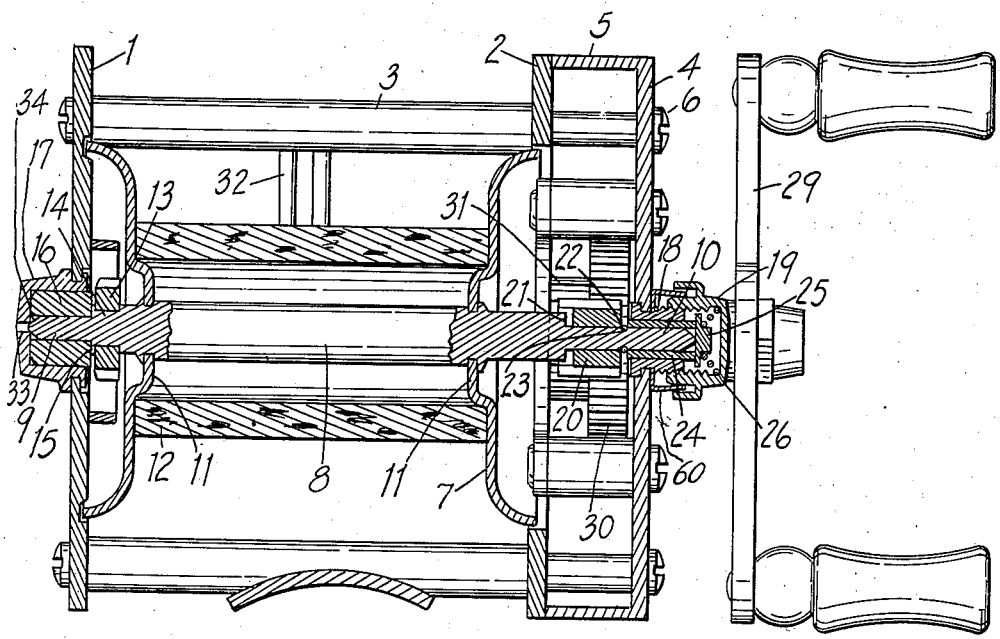
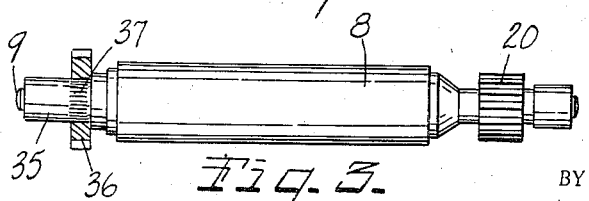
INVENTOR.
William G. Balz
BY
Earl & Chappell
ATTORNEYS April 14, 1942.            W. G. BALZ                2,279,434
                         FISHING REEL
                     Filed Feb. 18, 1939           2 Sheets-Sheet 2

INVENTOR.
William G. Balz
BY Earl & Chappell
ATTORNEYS

Patented Apr. 14, 1942

2,279,434

UNITED STATES PATENT OFFICE 2,279,434

FISHING REEL

William G. Balz, Kalamazoo, Mich., assignor to Shakespeare Company, Kalamazoo, Mich.

Application February 18, 1939, Serial No. 257,146

18 Claims. (Cl. 242—84.5)

The main objects of this invention are:

First, to provide a fishing reel well adapted for use in casting which substantially eliminates the necessity for thumbing the spool in making a cast.

Second, to provide a reel adapted for casting which permits a natural grasping of the rod in relation to the reel.

Third, to provide a reel structure in which the bearing parts are so related to the spool that they act to normally constitute substantial frictional drag means for retarding the rotation of the spool.

Fourth, to provide a means of this character which can be readily embodied in types of reels now extensively on the market.

Fifth, to provide means for accomplishing the results specified which are very economical in the matter of parts and the assembly thereof.

Objects pertaining to details and economies of the invention will definitely appear from the description to follow. The invention is defined in the claims.

A structure which embodies the features of the invention is clearly illustrated in the accompanying drawings, in which:

Fig. 1 is a head end elevation of a reel embodying the features of the invention.

Fig. 2 is a fragmentary view mainly in longitudinal section on line 2—2 of Fig. 1.

Fig. 3 is a side elevation of a slightly modified form or embodiment of spool shaft with the click and the spool pinion and bearings thereon.

Figure 4:
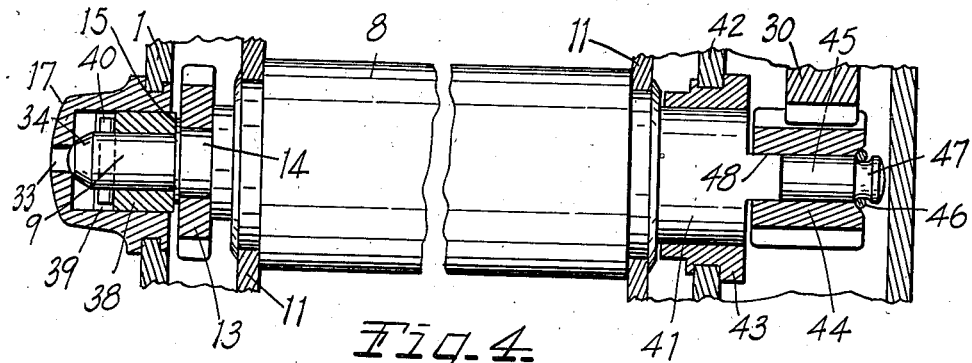
Fig. 4 is an enlarged fragmentary view partially in section of another modification of my invention.

In the accompanying drawings the invention is illustrated as embodied in a level wind type of reel, but inasmuch as the level wind features form no part of this invention they are not detailed herein.

In the structures illustrated in the accompanying drawings the frame comprises tail plate 1 and head plate 2 with suitable connecting pillars 3. The housing member 4 in the embodiment illustrated is provided with an inturned flange 5 and is detachably mounted upon the pillars by means of the screws 6 tapped into the ends of the pillars. This housing member 4 coacts with the head plate 2 in providing a housing for the gears.

The spool designated generally by the numeral 7 comprises the shaft 8 having tail spindle 9 and head spindle 10. The flanges 11 are secured upon the shaft and are suitably designed to support the barrel 12 which in this illustration is formed of a tubular section of cork. The click pinion 13 is arranged upon the enlarged portion 14 of the tail spindle and retained thereon by upsetting at 15. A bearing 16 is secured upon the spindle 9 to rotate therewith, this being a pressed fit upon the spindle in the embodiment here illustrated.

The tail plate 1 is provided with a cap bearing 17 for the bearing member 16. It will be observed that the bearing member 16 is in end thrust bearing engagement with the cap and that the bearing member 16 is of much greater diameter than the spindle. It is also of substantially greater diameter than the portion of the shaft engaging the click pinion.

The housing member 4 is provided with a bearing 18 which projects therefrom and is externally threaded to receive the cap 19. The spool pinion 20 is mounted upon the head spindle 10 and has a jaw driving engagement therewith as indicated at 21. This pinion is retained upon the spindle by means of the split ring 22 which is engaged in a groove 23 provided therefor in the spindle. At the outer side of this split ring the spindle is provided with a sleeve-like bearing member 24 which is a pressed fit upon the spindle or otherwise secured thereto. The outer end of this bearing member 24 projects beyond its bearing 18 in position to be engaged by the thrust member 25 within the cap 19. This thrust member is yieldably supported by the coiled spring 26 and acts not only to constitute a friction member coacting with the end of the shaft and the end of the spindle, but also to serve as a thrust member thrusting the spool axially to bring its bearing 16 into end frictional bearing relation to the cap bearing 17.

The cap 19 is provided with indicia for indicating direction of rotation with emblems in connection therewith, in this case the words "More" and "Less." The cap is also provided with a pointer 27 operatively associated with gauging indicia 28 on the housing member 4.

The crank 29 is provided with a gear 30 within the chambered head meshing with the pinion 20 and also with the level wind mechanism driving pinion 31. The line guide eye of the level winding mechanism is indicated at 32. The spool bearing members are of large diameter relative to the spool, that is, relative to the diameter and weight of the spool parts, and they act to normally constitute substantial frictional drag means for retarding rotation of the spool. The adjustable cap 19 and its associated parts provide means for supplying additional and variable frictional drag action.

In the embodiment detailed in Fig. 2 there is quite a wide variation in frictional drag action made possible. In this embodiment the cap bearing member 17 is provided with a central oil hole 33, the end of the spindle being tapered at 34 so that it normally serves as a closure for this opening. By thrusting the spool toward the right against the tension of the spring 26 the oil hole is opened and oil may be introduced. It may be introduced to the bearings at the opposite end of the reel by removing the cap 19.

Fig. 3 illustrates a slightly modified form or embodiment in which the spindle 9 of the spool shaft 8 is provided with a bearing member 35 on which the pinion 36 is pressed, the bearing member being slightly roughened as conventionally shown at 37 to provide effective driving engagement between it and the click pinion.

In the embodiment shown in Fig. 4 the spool shaft 8 is provided with a click pinion 13 as is shown in Fig. 1, the bearing member 38 being slotted at 39 to receive the transverse key or pin 40. At its opposite end the shaft 8 is provided with an enlarged bearing member 41, the end frame head plate 42 carrying a bearing 43. The spool pinion 44 is sleeved upon the spindle 45 and retained thereon by the split ring 46 engaging the annular groove 47. The pinion has a jaw engagement with the bearing 41 as indicated at 48.

Figure 5:
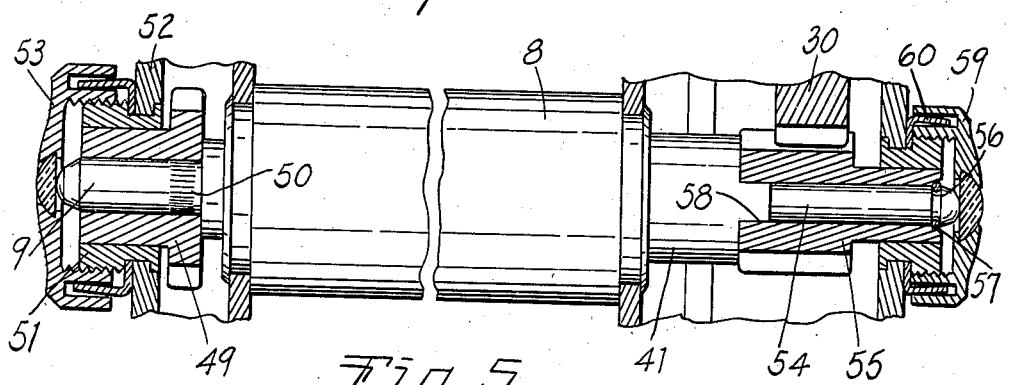
Fig. 5 is an enlarged fragmentary view partially in section of still another modification or adaptation of the invention.
Figure 6:
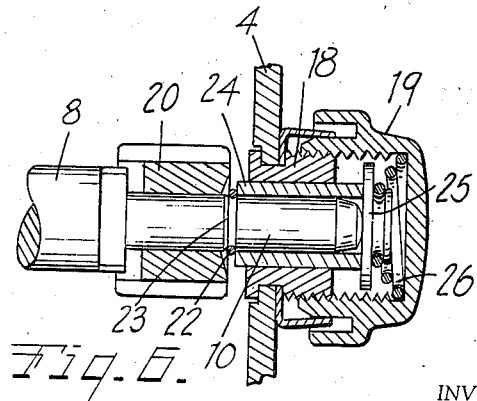
Fig. 6 is an enlarged fragmentary view mainly in section of parts shown in Fig. 2.

In the embodiment shown in Fig. 5 the spindle 9 of the spool shaft 8 has a combined bearing and click pinion 49 mounted thereon with a pressed fit, the spindle being serrated at 50 to provide an effective driving engagement. The bearing 51 carried by the tail plate 52 is provided with an adjustable cap 53 in thrust supporting engagement with the end of the spindle 9. The head spindle 54 has a combined spool pinion and bearing 55 retained thereon by means of the split ring 57 engaging a groove 56 in the spindle, the member 55 having a jaw engagement indicated at 58 with the pinion. The cap 59 is also in thrust engagement with the end of the spindle.

In the embodiments of Figs. 2 and 5 the cap members are provided with springs 60 for retaining them in their adjusted positions. It will be noted that the thrust member 25 is floatingly supported by its supporting spring 26 seated within the cap so that the thrust member can readily adjust itself to the parts engaged thereby.

In the embodiment shown in Figs. 1 and 2 I provide a relatively large thrust area bearing for the spool spindle or pivot and, in effect, large diameter pivots for both the head and tail ends of the spool. By this means the desired drag may be secured on the spool and it will be appreciated that it is uniform in all operating conditions. While the spool is subject to substantial frictional drag at all times retarding its rotation, the means described for providing the end thrust friction enable very accurate adjustment to meet the needs of the particular caster or to adjust the reels to the casting of lures of different weights.

Another advantage of the invention, particularly the embodiments illustrated in Figs. 2 and 5, is that the bearing features may be embodied in reels of types now extensively used without redesigning the parts thereof. In the embodiment shown in Fig. 5 the same ratchet pinion or spool pinion may be employed as are now employed in reels in common use. For example, referring to Fig. 2, the bearing member may be of as large diameter as the pinion itself if desired. The integral pinion and bearing members shown in Fig. 5 are practical but not as economical from a manufacturing standpoint as the preferred embodiment.

I have illustrated and described the invention in very practical embodiments thereof. I have not attempted to illustrate or describe other modifications or adaptations possible as it is believed this disclosure will enable those skilled in the art to embody or adapt my invention as may be desired.

Having thus described my invention what I claim as new and desire to secure by Letters Patent is:

1. In a fishing reel, the combination with a frame comprising tail and head end plates and connecting pillars, a housing member mounted on said pillars at the outer side of the head end plate, a spool provided with tail and head spindles, a cap bearing on said tail plate, a bearing on said housing member projecting outwardly therefrom and externally threaded on its projecting end, a click pinion at the tail end of the spool, a bearing member on the tail spindle disposed at the outer side of said click pinion and having end thrust engagement with said cap bearing on said tail plate, a spool pinion sleeved upon the head spindle of said spool, a sleeve-like bearing member mounted on said head spindle at the outer side of said spool pinion and projecting beyond said bearing on said housing member, a cap threaded for adjustment on said bearing on said housing member, and a spring supported thrust member arranged in said cap in engagement with the end of the spool head spindle and with said bearing thereon, said bearing members on said spool spindles being of large diameter relative to the spool spindles at the point of attachment of the bearing members thereto and acting to normally constitute substantial frictional drag means for retarding rotation of the spool, said adjustable cap providing means for supplying additional variable frictional drag action.

2. In a fishing reel, the combination with a frame comprising tail and head end plates and connecting pillars, a housing member mounted on said pillars at the outer side of the head end plate, a spool provided with tail and head spindles, a cap bearing on said tail plate, a bearing on said housing member projecting outwardly therefrom and externally threaded on its projecting end, a click pinion at the tail end of the spool, a bearing member on the tail spindle disposed at the outer side of said click pinion and having end thrust engagement with said cap bearing on said tail plate, a spool pinion sleeved upon the head spindle of said spool, a sleeve-like bearing member mounted on said head spindle at the outer side of said spool pinion, a cap threaded for adjustment on said bearing on said housing member, and a spring supported thrust member arranged in said cap in engagement with the end of the spool head spindle, said bearing members on said spool spindles being of large diameter relative to the spool spindles at the point of attachment of the bearing members thereto and acting to normally constitute substantial frictional drag means for retarding rotation of the spool, said adjustable cap providing means for supplying additional variable frictional drag action.

3. In a fishing reel, the combination with a frame comprising tail and head end plates and connecting pillars, a housing member mounted on said pillars at the outer side of the head end plate, a spool provided with tail and head spindles, a cap bearing on said tail plate, a bearing on said housing member projecting outwardly therefrom and externally threaded on its projecting end, a click pinion at the tail end of the spool, a bearing member on the tail spindle disposed at the outer side of said click pinion and having end thrust engagement with said cap bearing on said tail plate, a spool pinion sleeved upon the head spindle of said spool, a sleeve-like bearing member mounted on said head spindle at the outer side of said spool pinion and projecting beyond said bearing on said housing member, a cap threaded for adjustment on said bearing on said housing member, and a spring supported thrust member arranged in said cap in engagement with the end of said bearing member on said head spindle, said bearing members on said spool spindles being of large diameter relative to the spool spindles at the point of attachment of the bearing members thereto and acting to normally constitute substantial frictional drag means for retarding rotation of the spool, said adjustable cap providing means for supplying additional variable frictional drag action.

4. In a fishing reel, the combination with a frame comprising tail and head end plates and connecting pillars, a housing member mounted on said pillars at the outer side of said head end plate, a spool provided with tail and head spindles, a cap bearing on said tail plate, a bearing on said housing member projecting outwardly therefrom and externally threaded on its projecting end, a bearing member on the tail spindle having end thrust engagement with said bearing on said tail plate, a sleeve-like bearing member mounted on said head spindle and projecting beyond said bearing on said housing member, a cap threaded for adjustment on said bearing on said housing member, and a spring supported thrust member arranged in said cap in engagement with the end of the spool head spindle and with said bearing thereon, said bearing members on said spool spindles being of large diameter relative to the spool spindles at the point of attachment of the bearing members thereto and acting to normally constitute substantial frictional drag means for retarding rotation of the spool, said adjustable cap providing means for supplying additional variable frictional drag action.

5. In a fishing reel, the combination with a frame comprising tail and head end plates and connecting pillars, a housing head member, a spool provided with a rotatable mounting including tail and head spindles, a bearing on said tail plate, a bearing on said housing member, a bearing member fixedly mounted on the tail spindle coacting with said bearing on said tail plate, a spool pinion sleeved upon the head spindle of said spool, and a sleeve-like bearing member fixedly mounted on said spindle at the outer side of said spool pinion and coacting with said housing member bearing, said bearing members on said spool spindles having direct rotatable sliding frictional engagement with said bearings and being of large diameter relative to the spool spindles at the point of attachment of the bearing members thereto and acting to normally constitute substantial frictional drag means for retarding rotation of the spool, and adjustable axial thrust means carried by one of said plates and acting on said rotatable spool mounting to provide additional variable drag means for the spool.

6. In a fishing reel, the combination with a frame, a spool provided with tail and head spindles, a click pinion secured to one of said spindles, a bearing of substantially larger diameter than the diameter of the part of the spindle receiving said click pinion secured to said spindle at the outer side of said click pinion, a spool pinion mounted on the head spindle of said spool and having driving engagement therewith, a retaining ring disposed at the outer side of said spool pinion, said spindle being grooved to receive said retaining ring, a bearing member arranged on said head spindle at the outer side of said retaining ring, said frame being provided with bearings for said bearing members on said spindles, said bearing members acting to normally constitute substantial drag means for retarding rotation of the spool, and adjustable end thrust means axially engaging one of said bearing members for providing additional and variable frictional drag means for retarding rotation of the spool.

7. In a fishing reel, the combination with a frame, a spool provided with tail and head spindles, a click pinion secured to one of said spindles, a bearing of substantially larger diameter than the diameter of the part of the spindle receiving said click pinion secured to said spindle at the outer side of said click pinion, a spool pinion mounted on the head spindle of said spool and having driving engagement therewith, a bearing member arranged on said head spindle at the outer side of said spool pinion, said frame being provided with bearings for said bearing members on said spindles, said bearing members acting to normally constitute substantial drag means for retarding rotation of the spool, and adjustable end thrust means axially engaging one of said bearing members for providing additional and variable frictional drag means for retarding rotation of the spool.

8. In a fishing reel, the combination with a frame, a spool provided with tail and head spindles, a click pinion secured to one of said spindles, a bearing member of substantially larger diameter than the diameter of the part of the spindle receiving said click pinion secured to said spindle for rotation therewith on the outer side of said click pinion, a spool pinion mounted on the head spindle of said spool and having driving engagement therewith, said head spindle having fixedly secured thereto for rotation therewith a bearing member at the outer side of said spool pinion of substantially larger diameter than the portion of the head spindle receiving the same, said frame being provided with fixed bearings having direct rotatable sliding frictional engagement with said bearing members on said spindles, said bearing members acting to normally constitute substantial drag means for retarding rotation of the spool, and adjustable end thrust means acting on said spindle to provide an additional variable frictional drag action for the spool.

9. In a fishing reel, the combination with a frame, a spool provided with tail and head spindles, a click pinion secured to one of said spindles, a bearing member of substantially larger diameter than the diameter of the part of the spindle receiving said click pinion fixedly secured to said spindle on the outer side of said click pinion, a spool pinion mounted on the head spindle of said spool and having driving engagement therewith, said head spindle having fixedly secured thereto for rotation therewith a bearing member of substantially larger diameter than the portion of the head spindle receiving the same, said frame being provided with fixed bearings having direct rotatable sliding frictional engagement with said bearing members on said spindles, said bearing members acting to normally constitute substantial drag means for retarding rotation of the spool, and adjustable end thrust means acting on said spindle to provide an additional variable frictional drag action for the spool.

10. In a fishing reel, the combination with a frame, of a spool provided with tail and head spindles provided with bearing members rotatable therewith, a bearing on said frame coacting with one of said bearing members in end thrust bearing relation, a bearing for the other bearing member mounted on said frame to project therefrom with the bearing member projecting beyond its bearing, a cap having threaded adjustment on said last named bearing, and a spring supported thrust member within said cap in operative relation to the head spindle and engaging the bearing thereon, said bearing members being of substantially larger diameter than the spindles at the point of their securement to the latter and acting to normally constitute a substantial drag means for retarding the spool, said adjustable cap providing means for securing additional and variable frictional drag action on the spool.

11. In a fishing reel, the combination with a frame, of a spool provided with a spindle having tail and head bearing members secured thereto adjacent its ends and rotatable therewith, a bearing on said frame coacting with one of said bearing members, a bearing for the other bearing member mounted on said frame to project therefrom, a cap having threaded adjustment on said last named bearing, and a spring supported thrust member within said cap in operative relation to the head bearing member, said bearing members being of large diameter relative to said spindle ends and acting in conjunction with said bearings to normally constitute frictional means for substantially retarding the spool, said adjustable cap providing means for securing additional and variable frictional drag action on the spool.

12. In a fishing reel, the combination with a frame, a spool provided with a spindle having tail and head bearing members secured thereto adjacent its ends and rotatable therewith, a bearing on said frame coacting with one of said bearing members in end thrust bearing relation, a bearing for the other bearing member mounted on said frame to project therefrom with the bearing member projecting beyond its bearing, a cap having threaded adjustment on said bearing, and a spring supported thrust member within said cap in operative relation to the head bearing member, said bearing members being of large diameter relative to said spindle ends and acting in conjunction with said bearings to normally constitute a frictional means for substantially retarding the spool, said adjustable cap providing means for securing additional and variable frictional drag action on the spool.

13. In a fishing reel, the combination with a frame, a spool provided with a spindle having tail and head bearing members secured thereto adjacent its ends and rotatable therewith, bearings therefor on said frame, said bearing members being of large diameter relative to said spindle ends and acting in conjunction with said bearings to normally constitute substantial frictional drag means for retarding rotation of the spool, and a bearing cap threaded for adjustment on one of said bearings and having thrust relation to one of the said bearing members for providing additional and variable frictional drag action for the spool.

14. In a fishing reel, the combination with a frame, of a spool provided with a spindle having tail and head bearing members rotatable therewith, a cap-like bearing for the tail bearing member having a central lubricant opening therein, the end of said tail bearing member being in end thrust bearing relation with the said cap-like tail bearing, the tail bearing member being of large diameter relative to the spindle at its point of securement thereto and acting to normally constitute a substantial drag means for retarding the spool, a bearing for the head bearing member, a cap having threaded adjustment with said last named bearing, and a spring supported thrust member within said cap in operative relation to said spool for imparting end thrust thereto and adjustable to regulate the end thrust upon the said tail bearing member and thereby providing variable frictional drag action on the spool, the end of the tail bearing member constituting a closure for said lubricant opening in said cap and the said opening being opened by forcing the spool axially against said spring supported thrust member.

15. In a fishing reel, the combination of a frame, a spool including a spindle and bearing members separate from and fixedly secured to said spindle adjacent the ends thereof, one of said bearing members having a bearing surface including an end thrust portion of substantially larger area than the spindle adjacent its point of securement thereto, bearings on said frame for said spindle including a cap-like thrust bearing coacting with said end thrust bearing member, and an adjustable cap coacting with the other bearing member, said cap having threaded adjustment relative to the frame, and resilient means between said cap and the adjacent bearing member to regulate the end thrust upon said cap-like bearing and thereby provide variable frictional drag action on the spool.

16. In a fishing reel, the combination of a frame, a spool including a spindle and bearing members separate from and fixedly secured to said spindle adjacent the ends thereof, one of said bearing members having a bearing surface of substantially larger area than the spindle adjacent its point of securement thereto, bearings on said frame for said spindle including a cap-like thrust bearing coacting with one of said bearing members, and an adjustable cap coacting with the other thereof, said cap having threaded adjustment relative to the frame, and resilient means between said cap and the adjacent bearing member to regulate the end thrust upon said cap-like bearing and thereby provide variable frictional drag action on the spool.

17. In a fishing reel, in combination with a spool and an end plate having an opening therein provided with an annular bearing, a rotatable structure coacting with said bearing for rotatably mounting the spool on the reel comprising a rotatable spindle to which the spool is secured, and a bearing member telescoped on said spindle and angularly fixed thereto for rotation therewith, said member being rotatable in said bearing with the bearing surfaces thereof in direct sliding frictional contact, said coacting frictional surfaces being of substantially greater diameter than the portion of the spindle on which the bearing member is mounted whereby to normally constitute friction means for substantially retarding rotation of the spool, and an adjusting cap device having means adjustably threaded on said bearing, said device being engageable with said rotatable bearing structure for securing additional and variable frictional drag action on the spool.

18. In a fishing reel, in combination with a spool and an end plate having an opening therein provided with an annular bearing, a rotatable structure coacting with said bearing for rotatably mounting the spool on the reel comprising a rotatable spindle to which the spool is secured, and a bearing member telescoped on said spindle and angularly fixed thereto for rotation therewith, said member being rotatable in said bearing with the bearing surfaces thereof in direct sliding frictional contact, said coacting frictional surfaces being of substantially greater diameter than the portion of the spindle on which the bearing member is mounted whereby to normally constitute friction means for substantially retarding rotation of the spool, and an adjusting device engageable with said rotatable bearing structure for securing additional and variable frictional drag action on the spool.

WILLIAM G. BALZ.